United States Patent [19]

Gaviani et al.

[11] Patent Number: 5,565,712
[45] Date of Patent: Oct. 15, 1996

[54] SYSTEM FOR OPERATING AND CONTROLLING ACTUATORS, SENSORS, AND DEVICES INSTALLED IN THE BODYWORK, OF A VEHICLE ENGINE, AND AIR INTAKE ASSEMBLY

[75] Inventors: Giovanni Gaviani, Rimini; Luca Biagini, Scandiano, both of Italy

[73] Assignee: Magneti Marelli S.P.A., Milano, Italy

[21] Appl. No.: 407,213

[22] Filed: Mar. 20, 1995

[30] Foreign Application Priority Data

Mar. 22, 1994 [IT] Italy .................. BO94A0119

[51] Int. Cl.⁶ .................................. H01R 33/00
[52] U.S. Cl. .................. 367/10.1; 123/478; 439/34
[58] Field of Search .................. 307/9.1, 10.1, 307/147; 361/692, 752; 123/198 E, 478, 647; 55/385.3, DIG. 28; 439/34

[56] References Cited

U.S. PATENT DOCUMENTS

| | | | |
|---|---|---|---|
| 3,996,914 | 12/1976 | Crall | 123/198 E |
| 4,050,093 | 9/1977 | Crall et al. | 361/692 |
| 4,275,694 | 6/1981 | Nagaishi | 123/478 |
| 4,512,314 | 4/1985 | Sakamoto et al. | 123/478 |
| 5,207,186 | 5/1993 | Okita | 123/198 E |

FOREIGN PATENT DOCUMENTS

| | | | |
|---|---|---|---|
| 2676885 | 11/1992 | France . | |
| 9100962 | 4/1991 | Germany . | |
| 58-174145 | 6/1982 | Japan . | |
| 0122311 | 7/1983 | Japan | 123/647 |

Primary Examiner—William M. Shoop, Jr.
Assistant Examiner—Richard T. Elms
Attorney, Agent, or Firm—Baker & Daniels

[57] ABSTRACT

An electronic unit having three connectors connected to three other connectors which constitute the terminal parts of respective bundles of electric cables. A first bundle relates to cables connected to the actuators, sensors and devices installed in the bodywork of the vehicle, a second bundle relates to cables connected to the actuators, sensors, and devices installed in the engine of the vehicle, and a third bundle relates to cables connected to the actuators, sensors, and devices installed in the air intake assembly. The unit is carried by a body of the air intake assembly.

4 Claims, 2 Drawing Sheets

SYSTEM FOR OPERATING AND CONTROLLING ACTUATORS, SENSORS, AND DEVICES INSTALLED IN THE BODYWORK, OF A VEHICLE ENGINE, AND AIR INTAKE ASSEMBLY

BACKGROUND OF THE INVENTION

The invention relates to a system for operating and controlling actuators, sensors and device installed in the bodywork of a vehicle, an engine of the vehicle, and an air intake assembly.

As is known, a system of the above-mentioned type comprises an electronic unit mounted in the engine compartment, and to which are connected all the actuators, sensors and devices installed in the various parts of the vehicle. The unit has a male connector connected to a female connector forming the terminal part of a bundle of electric cables connected to the above-mentioned components of the vehicle. In its run this bundle of cables divides into sub-bundles which in their turn divide in their run into cables which are then connected to the various components of the vehicle.

The system described above has a number of disadvantages.

In particular, as is known, the longer the run of the electric cables which originate from the unit, the more frequent the possibility of such cables behaving like an antenna receiving spurious signals from the outside which will interfere with the signals received from and generated by the unit itself. Furthermore, every time the bundles and sub-bundles divide they require connectors which constitute one of the weak points of the entire electrical connection system insofar as they may be subject to mechanical stresses which foster electrical disconnection. Essentially the entire electrical connection system is complicated to assemble and requires a long period of time because of the long run of electric cables which, among other things, require runs remote from sources of heat and mounting brackets and because of the large number of electrical connections to be made.

SUMMARY OF THE INVENTION

The object of the invention is to produce a system for operating and controlling actuators, sensors and devices installed in the bodywork of a vehicle, engine of the vehicle, and an air intake assembly which does not have the above-mentioned disadvantages and which is thus provided with an electrical connection system which is easy to operate and requires less installation time.

Further objects and advantages of the invention will emerge from the description below.

The present invention, in one form thereof, provides a system for operating and controlling actuators, sensors and devices installed in the bodywork of a vehicle, an engine of the vehicle, and an air intake assembly. The system comprises an electronic unit having a first electrical connector connected to a second electrical connector forming the terminal part of a first bundle of electric cables connected to the actuators, sensors and devices installed in the bodywork of the vehicle, a third electrical connector connected to a fourth electrical connector forming the terminal part of a second bundle of electric cables connected to the actuators, sensors and devices installed in the engine of the vehicle, a fifth electrical connector connected to a sixth electrical connector forming the terminal part of a third bundle of electric cables connected to the actuators, sensors and devices installed in the air intake assembly; the unit is carried by a body of the air intake assembly.

BRIEF DESCRIPTION OF THE DRAWINGS

Two preferred embodiments will now be described in order to provide a better understanding of the invention, purely by way of non-exhaustive examples and with reference to the accompanying drawings, in which.

DETAILED DESCRIPTION OF THE INVENTION

Figure 1:
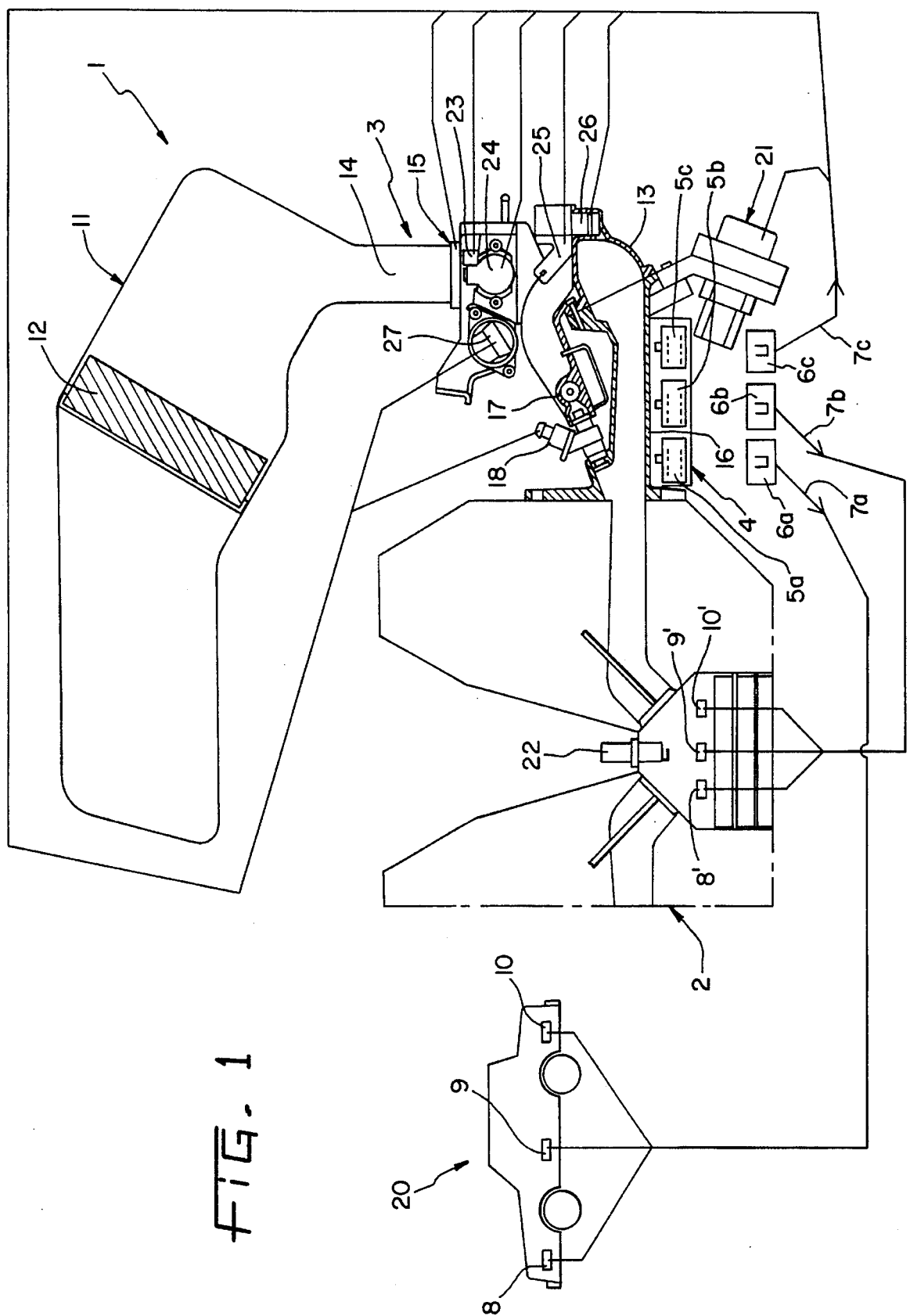
Fig. 1 is a diagrammatic and part-sectional view of a first embodiment of the system to which the invention relates.
Figure 2:
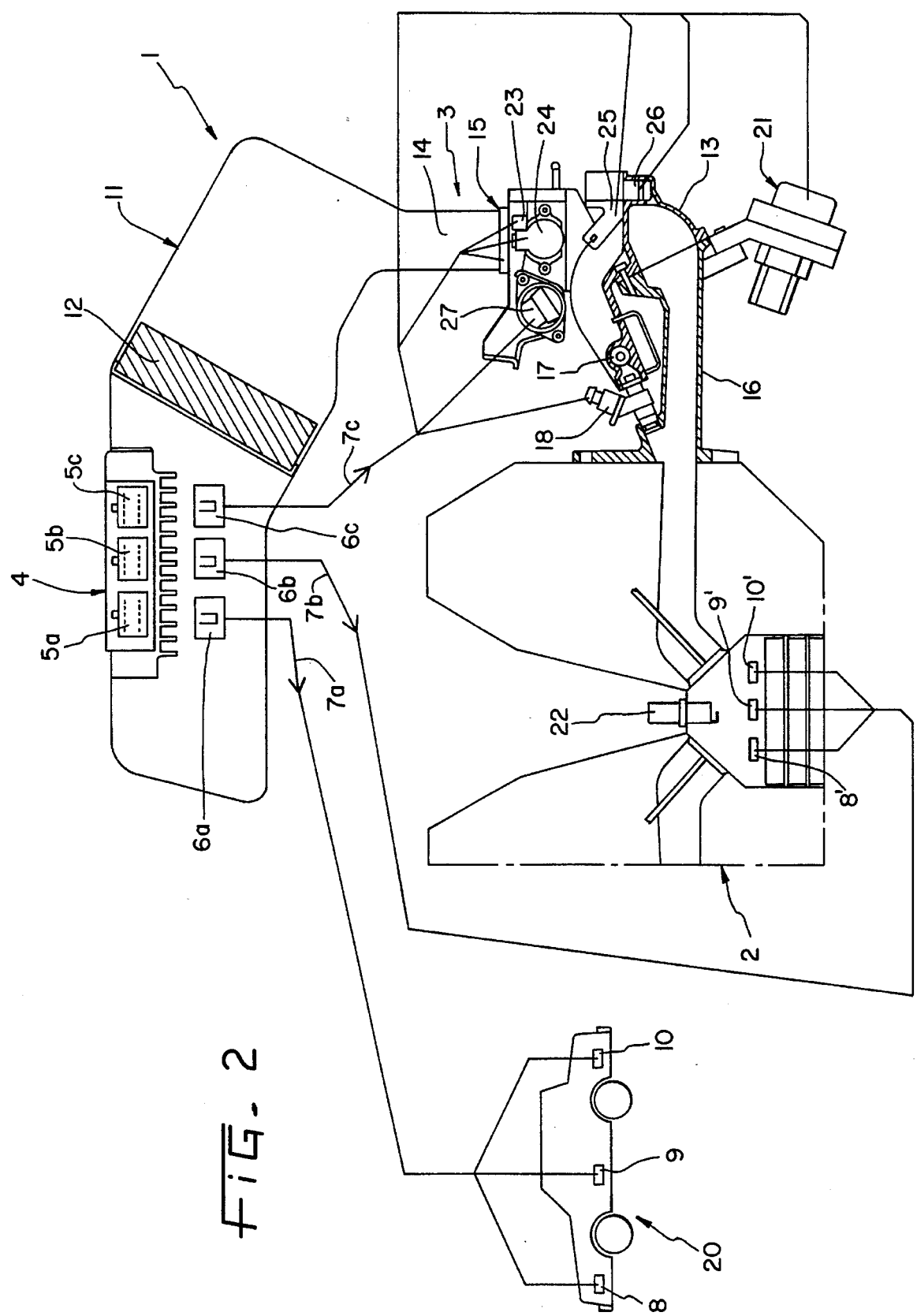
FIG. 2 is a diagrammatic and part-sectional view of a second embodiment of the system to which the invention relates.

According to the illustrations in FIGS. 1 and 2, in its entirety 1 denotes a system for operating and controlling actuators, sensors and devices installed in bodywork 20 of a vehicle, engine 2 (partially shown) of the vehicle, and air intake assembly 3. System 1 shown here relates to an engine in which the supply of the air/fuel mixture is of the type known as multi-point and hence to an engine in which a corresponding injector is coupled to each engine cylinder.

System 1 comprises electronic unit 4 having three male (female) connectors 5a, 5b and 5c capable of being coupled to three female (male) connectors 6a, 6b and 6c which constitute the terminal parts of respective bundles 7a, 7b and 7c of electric cables. Bundle 7a relates to electric cables connected to actuators, sensors and devices 10 installed in the bodywork of the vehicle such as, for example, a device for air-conditioning the interior compartment of the vehicle, a device for controlling the central locking of the vehicle's doors, a device for actuating the supply to a lighting assembly, a device for actuating a windscreen wiper assembly, etc. Bundle 7b relates to electric cables connected to actuators 8', sensors 9' and devices 10' installed in engine 2 of the vehicle such as, for example, an engine stroke sensor, an engine revolutions sensor, an engine cooling device, a device for recording the composition of the exhaust gases etc.

Air intake assembly 3 comprises first body 11 in which air filter 12 is installed, second body 13, pipe 14 which puts body 11 in communication with body 13 and along which motorized throttle-valved body 15 is installed, a multiplicity of pipes 16 which originate from the body 13 and which convey the air/fuel mixture towards an inlet of a respective engine cylinder. Installed on air intake assembly 3 are fuel manifold 17, a multiplicity of injectors 18 (one per engine cylinder), each of which is capable of injecting fuel into a respective pipe 16, and electrical ignition coil 21 connected in a way which is not illustrated to spark plugs 22 installed in the engine cylinders. Sensors and valves are installed along the entire air intake assembly and, in particular, air temperature sensor 23 is installed on throttle-valved body 15, throttle position sensor 24 is installed on throttle-valved body 15, load sensor 25 for air flowrate detection is installed on body 13, valve 26 is installed on body 13 and is capable of defining the blow-by of the fuel vapours from fuel manifold 17 towards the inside of body 13, and valve 27 installed on throttle-valved body 15 and is capable of recording the position of the throttle valve of body 15 at idling speed.

Bundle 7c relates to electric cables connected to actuators, sensors and devices installed in air intake assembly 3 and, in particular, connected to motorized throttle-valved body 15, to injectors 18, to electrical ignition coil 21, to sensors 23, 24 and 25, and to valves 26 and 27. Unit 4 is fixed to a body of air intake assembly 3 and, in particular, either to an external wall of one of pipes 16 as shown in FIG. 1, or to body 11 as shown in FIG. 2.

In practice, after the production of the air intake assembly and the installation of all the above-mentioned elements, actuators, sensors and devices, unit 4 is installed either on one of pipes 16 or on body 11. It is now possible to connect connectors 5c and 6c together and to connect the cables of bundle 7c to the above-mentioned elements, actuators, sensors and devices. Following these connections it is possible to carry out, prior to the installation of assembly 3 on engine 2, the testing of such elements, actuators, sensors and devices. After the above-mentioned operations the manufacturer of assembly 3 can send assembly 3 (in which unit 4 and the above-mentioned elements, actuators, sensors and devices are integrated) to the car manufacturer.

At the car manufacturer's premises, after having installed assembly 3 on engine 2, the connections are made between connectors 5b and 6b and the connections between the cables of bundle 7b and the elements, actuators 8', sensors 9' and devices 10' are fitted to engine 2. Following these connections it is possible to carry out, prior to the installation of the engine 2 in the vehicle's engine compartment, the testing of the elements, actuators, sensors and devices fitted to engine 2. Finally, after having installed engine 2 in the engine compartment, the connections are made between connectors 5a and 6a, and the connections between the cables of bundle 7a and the elements, actuators 8, sensors 9 and devices 10 are fitted in the bodywork of the vehicle. These elements may also be subject to testing.

The advantages gained with the implementation of the invention will be evident from the above description.

In particular, air intake assembly 3 has been produced in which electronic unit 4 and a multiplicity of elements, actuators, sensors and devices which can be tested prior to sending this assembly 3 to the vehicle manufacturer are integrated. Consequently, at the premises of the manufacturer of air intake assembly 3 it is possible to optimize the elements, actuators, sensors and devices fitted to the assembly and the materials used. It is therefore evident that with system 1, to which the invention relates, it is possible to produce an integrated assembly 3 of high quality and reliability and reduced assembly times and costs. Furthermore, with integrated assembly 3, the operations of electrical connections and testing carried out at the vehicle manufacturer's premises are facilitated, insofar as a bundle of cables is provided for each destination (bodywork, engine and intake assembly). It should be made clear that with system 1, the design of the runs through which the bundles of cables have to pass is simplified, and the runs can be reduced and therefore be free from interference. It should also be stressed that the installation of unit 4 on assembly 3 reduces the overall space occupied.

Finally it will be clear that modifications and variants may be introduced to the system 1 described and illustrated here without departing from the scope of the invention.

In particular, assembly 3 could support other elements also connected to unit 4 as well as those described above.

We claim:

1. A system for operating and controlling actuators, sensors and devices installed in the bodywork of a vehicle, an engine of the vehicle, and an air intake assembly of the vehicle, comprising:

an electronic unit having, at least, a first electrical connector connected to a second electrical connector forming a terminal part of a first bundle of electric cables connected to actuators, sensors and devices installed in said bodywork of said vehicle, a third electrical connector connected to a fourth electrical connector forming a terminal part of a second bundle of electric cables distinct from said first bundle and connected to actuators, sensors and devices installed in said engine of said vehicle, and a fifth electrical connector connected to a sixth electrical connector forming a terminal part of a third bundle of electric cables distinct from said first and second bundles and connected to actuators, sensors and devices installed in said air intake assembly, said unit being carried by a body of said air intake assembly.

2. The system according to claim 1, wherein said air intake assembly comprises a first body in which an air filter is installed, a second body, a first pipe which puts said first body in communication with said second body and along which a motorized throttle-valved body is installed, and at least one second pipe which originates from said second body and which conveys an air/fuel mixture towards an inlet of an engine cylinder, said unit being installed on said first body.

3. The system according to claim 1, wherein said air intake assembly comprises a first body in which an air filter is installed, a second body, a first pipe which puts said first body in communication with said second body and along which a throttle-valved body is installed, and at least one second pipe which originates from said second body and which conveys an air/fuel mixture towards an inlet of an engine cylinder, said unit being installed on an external wall of said second pipe.

4. The system according to claim 2, wherein installed on said air intake assembly are a fuel manifold, at least one injector capable of injecting fuel into said second pipe, an electrical ignition coil connected to spark plugs installed in the engine cylinders, a first sensor for air temperature, a second sensor for throttle position of the throttle-valved body, a third sensor for load air flowrate detection, a first valve capable of defining the blow-by of fuel vapours from said fuel manifold towards the inside of said second body, and a second valve capable of recording the position of the throttle-valve of said throttle-valved body at idling speed, said third bundle relating to electric cables connected to said motorized throttle-valved body, to said injector, to said electrical ignition coil, to said first sensor, to said second sensor, to said third sensor, and to said valves.

* * * * *